(12) United States Patent
Shankar et al.

(10) Patent No.: US 11,727,133 B2
(45) Date of Patent: Aug. 15, 2023

(54) ENFORCING DATA PRIVACY POLICIES FOR FEDERATED APPLICATIONS

(71) Applicant: International Business Machines Corporation, Armonk, NY (US)

(72) Inventors: Vivek Shankar, Singapore (SG); Jose Angel Rodriguez, Cayey, PR (US); Weide Victor Soon, Singapore (SG); Adrian Rinaldi Sasmita, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 17/246,094

(22) Filed: Apr. 30, 2021

(65) Prior Publication Data

US 2022/0350907 A1 Nov. 3, 2022

(51) Int. Cl.
*G06F 21/00* (2013.01)
*G06F 21/62* (2013.01)
*G06F 21/31* (2013.01)

(52) U.S. Cl.
CPC .......... *G06F 21/6218* (2013.01); *G06F 21/31* (2013.01)

(58) Field of Classification Search
CPC .............................. G06F 21/31; G06F 21/6218
See application file for complete search history.

(56) References Cited

U.S. PATENT DOCUMENTS

| 2015/0304448 | A1 | 10/2015 | Mathew et al. | |
|---|---|---|---|---|
| 2017/0111358 | A1* | 4/2017 | Hall | H04L 63/126 |
| 2021/0160236 | A1* | 5/2021 | Ray | H04L 63/20 |
| 2021/0279360 | A1* | 9/2021 | Gimenez Palop | G06F 21/6245 |
| 2021/0334402 | A1* | 10/2021 | Detchemendy | H04L 63/108 |

FOREIGN PATENT DOCUMENTS

| KR | 20220146048 | * | 4/2021 | H04L 9/50 |
|---|---|---|---|---|
| WO | 2020223735 A1 | | 11/2020 | |

OTHER PUBLICATIONS

Morfkonda et al., "Exploring Privacy Implications in OAuth Deployments," arXiv:2103.02579v1 [cs.CR] Mar. 3, 2021, 15 pages.
(Continued)

*Primary Examiner* — Joseph P Hirl
*Assistant Examiner* — Chi D Nguy
(74) *Attorney, Agent, or Firm* — Patterson + Sheridan, LLP (57) ABSTRACT

Embodiments herein describe a pattern or syntax that can be used to convey or express the reason or purpose for a service provider to request user data in an identity federation. A service provider can request user data from the identity provider using an authentication process. If the authentication process is successful, the identity provider provides an authorization token to the service provider which it can use to retrieve the user data. The embodiments herein obtain user consent in the same authentication process used to provide the authorization token. In order to do so, the embodiments herein introduce a pattern or syntax that the service provider uses to convey the purpose for which it wants to use the user data to the identity provider.

20 Claims, 4 Drawing Sheets

(56) References Cited

OTHER PUBLICATIONS

Daniel Lindegren, Farzaneh Karegar, Bridget Kane & John Sören Pettersson (2021) An evaluation of three designs to engage users when providing their consent on smartphones, Behaviour & Information Technology, 40:4, 398-414, DOI: 10.1080/0144929X.2019. 1697898.

Richer, J., et al. "Health Relationship Trust Profile for Fast Healthcare Interoperability Resources (FHIR) OAuth 2.0 Scopes", Harvard Medical School Department of Biomedical Informatics, Jul. 8, 2018. Viewed at: <https://openid.net/specs/openid-heart-fhir-oauth2-1_0.html>.

* cited by examiner

ENFORCING DATA PRIVACY POLICIES FOR FEDERATED APPLICATIONS

BACKGROUND

The present invention relates to obtaining consent during an authentication process, and more specifically, to providing a syntax or pattern for conveying purpose to an identity provider.

Identity providers typically share user personal identifiable information (PII) with applications using federation protocols like OpenID Connect 1.0, OAuth 2.0, or Security Assertion Markup Language (SAML) 2.0. Systems of this sort typically add an optional consent step where the user consents to sharing, for example, their phone number with a relying party application.

SUMMARY

One embodiment of the present invention is a method that includes identifying, at a service provider, desired user data and a purpose for that user data and transmitting, using a federation protocol, a request for the user data from the service provider to an identity provider. Further, the service provider and the identity provider are in an identity federation, and the request includes a defined syntax for conveying the purpose for the user data to the identity federation. The method also includes, after obtaining user consent for the user data to be used for the purpose identified by the service provider, receiving an authorization token from the identity provider to access the user data.

Another embodiment of the present invention is a service provider that includes a processor and memory storing an application, which when executed by the processor performs an operation. The operation includes identifying desired user data and a purpose for that user data and transmitting, using a federation protocol, a request for the user data to an identity provider. Further, the service provider and the identity provider are in an identity federation, and the request includes a defined syntax for conveying the purpose for the user data to the identity federation. The operation also includes, after obtaining user consent for the user data to be used for the purpose identified by the service provider, receiving an authorization token from the identity provider to access the user data.

Another embodiment of the present invention is a computer program product that includes a computer-readable storage medium having computer-readable program code embodied therewith, the computer-readable program code executable by one or more computer processors to perform an operation. The operation includes identifying, at a service provider, desired user data and a purpose for that user data and transmitting, using a federation protocol, a request for the user data from the service provider to an identity provider. Further, the service provider and the identity provider are in an identity federation, and the request includes a defined syntax for conveying the purpose for the user data to the identity federation. The operation also includes, after obtaining user consent for the user data to be used for the purpose identified by the service provider, receiving an authorization token from the identity provider to access the user data.

DETAILED DESCRIPTION

Embodiments herein describe a pattern or syntax that can be used to convey or express the reason or purpose for a service provider (e.g., a relying party application) to request user data (e.g., PII) in an identity federation. The identity federation can include multiple service providers which have a pre-existing relationship of trust with an identity provider. The user can have an account or store login credentials (e.g., username and password) with the identity provider which then can be used to identify the user at the service provider. For example, assume that a user wishes to open an account with a third-party service provider (e.g., an online web store or service). Rather than asking the user to come up with a new username and password, the service provider can leverage the login credentials the user already has with the identity provider. That is, the identity provider is delegated the responsibility for authenticating the user.

The service provider can then request user data (e.g., PII) from the identity provider using an authentication process. For example, the service provider may want the user's email address or telephone number for billing purposes or to provide a backup form of communication to the user. The identity provider and the service provider then go through the authentication process to ensure the service provider can access the requested user data. If the authentication process is successful, the identity provider provides an authorization token to the service provider which it can use to retrieve the user data. However, in the current authentication processes, there are two problems. First, the relying party application can optionally request user information (using one of the federation protocols), but does not specify what the application intends to use the user data for. This can result in several abuses of information shared where the application may use the data in a manner that is outside of the scope consented to by the user. Second, many techniques to obtain the PII via APIs do not allow for any form of prescribed and enforced consent. For example, a common method of obtaining an authorization token to access PII is to execute a Resource Owner Password Credentials (ROPC) flow with OAuth 2.0. The authorization token can then be used to obtain the PII. However, these grant flows do not allow any interruption in the authentication flow to obtain (or check for) user consent. Typically, after receiving the authorization token, the service provider would still need to receive consent from the user (e.g., ask the user sign an end-user license agreement (EULA)).

In contrast, the embodiments herein describe techniques for obtaining user consent in the same workflow (i.e., the same authentication process) used to provide the authorization token to the service provider. In order to do so, the embodiments herein introduce a pattern or syntax that the service provider uses to convey the purpose for which it wants to use the user data to the identity provider. By knowing the purpose, the identity provider can obtain user consent, or check to see if the user has already consented for the service provider to use the user data for the stated purpose. If so, when the identity provider provides the authorization token to the service provider, the service provider implicitly knows that it has user consent to use the PII for its stated purpose. In this manner, the pre-existing relationship of trust between the service provider and the identity provider from being in the same identity federation can be leveraged to obtain user consent during the authentication flow. That is, the identity provider trusts that the service provider will only use the user data according to its stated purpose.

Figure 1:
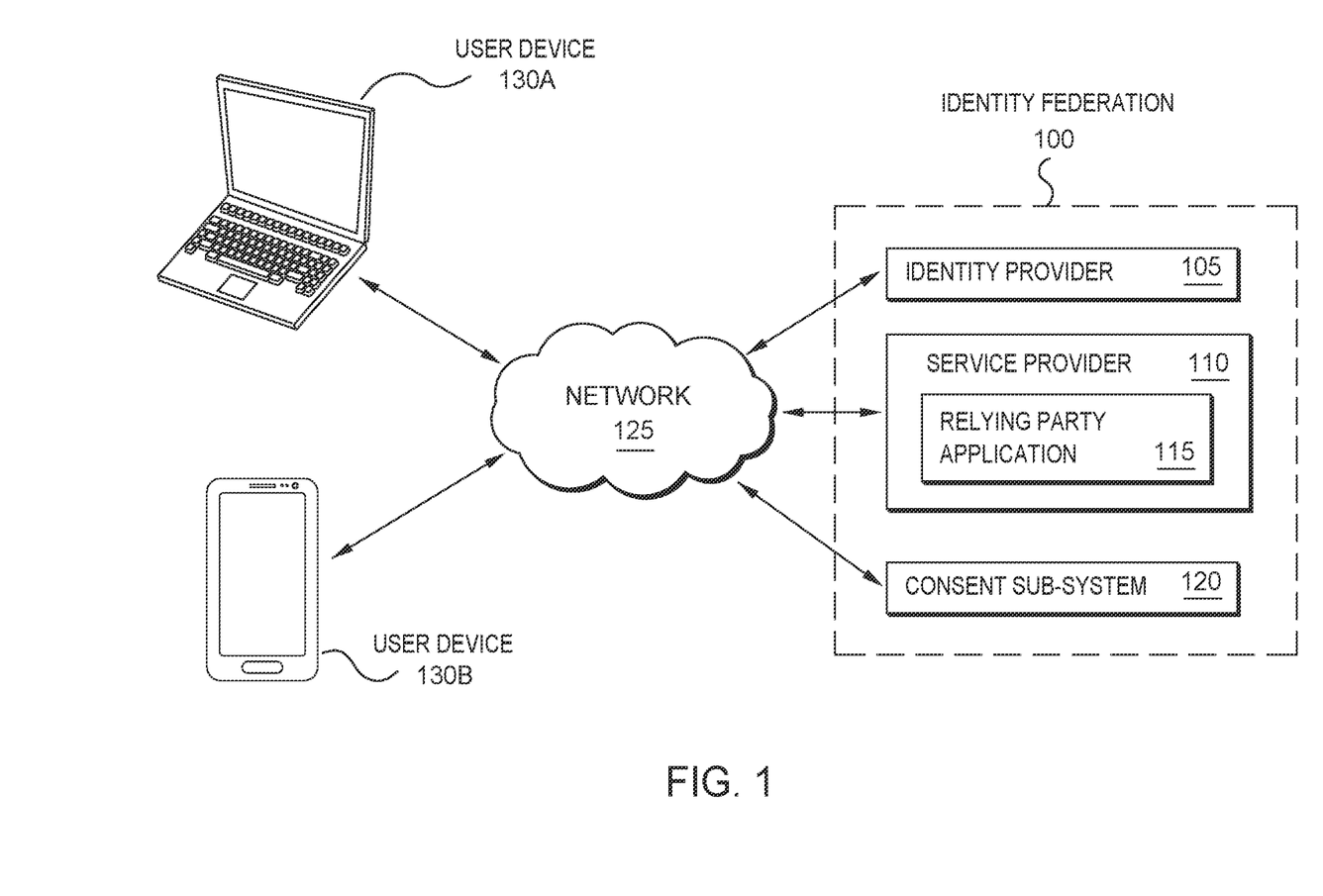
FIG. 1 illustrates an identity federation for obtaining consent during an authentication process, according to one example.

FIG. 1 illustrates an identity federation 100 for obtaining consent during an authentication process, according to one example. The identity federation 100 includes an identity provider 105, a service provider 110, and a consent sub-system 120 (also referred to as a Privacy and Consent Sub-System). The identity provider 105 (also referred to as IdP) is an entity that creates and manages identities of users and authenticates users to other applications that rely on the identity provider 105. While only one is shown, the identity federation 100 can have multiple different third-party identity providers. The service provider (SP) 110 (e.g., an entity that provides an online service or store) relies on the identity provider 105 for user authentication. That is, a user that already has an account with the identity provider 105 can log into that account in order to access the service hosted by the service provider 110.

In the identity federation 100, the process of authenticating a user for the service provider 110 is delegated to a trusted external party (i.e., the identity provider 105). That is, the service provider 110 and the identity provider 105 are typically two different entities (e.g., two different businesses, services, or networks). The identity provider 105 vouches for the identity of the users, and a service provider 110 provides services to the users in the form of a relying party application 115. For example, the relying party application 115 can be a game, an online store, a cloud computing service, and the like. For the identity federation 100 to function, the service provider 110 has a relationship of trust with the identity provider 105 since it relies on the identity provider 105 to authenticate the user. Also, as discussed below, the identity provider 105 should trust the service provider 110 since the service provider 110 expresses or conveys a purpose for which it intends to use user data. With this purpose, the identity provider 105 can obtain consent to share the user data with the service provider 110.

In one embodiment, the service provider 110 expresses the purpose for which it wants the user data using a predefined pattern or syntax. For example, in the request for the user data, the service provider 110 may use the pattern or syntax of: {{purpose}}/{{attribute}}:{{access}}. In this syntax, the "purpose" field or "purpose-of-use" field identifies how the data recipient (e.g., the service provider 110) intends to use the PII. For example. "Marketing" is a purpose for which the service provider 110 obtains user data such as an email address so that the service provider 110 can send marketing materials to the user. The "attribute" field in the syntax indicates what user data or PII is being requested (e.g., email address or telephone number). The "access" field in the syntax indicates what level of access is needed for the user data. For example, the service provider 110 may wish only to read the data, rather than have permission to change (or write) the data. As an example, if the service provider 110 wants the user's telephone number so it call the user to perform two-factor authentication, the pattern may be "security/telephone_number:read". This pattern informs the identity provider 105 that the service provider 110 wants to know the user's telephone number to provide additional security (i.e., the purpose). Further, the identity provider 105 knows the service provider 110 does not need to change the telephone number, but merely to read it. In another example, the pattern may be "billing/email:read". This pattern tells the identity provider 105 that the service provider 110 wants the user's email to send bills or process payments.

Moreover, the pattern or syntax used by the service provider 110 to convey the purpose-of-use of the PII to the identity provider 105 can be compatible with current federation protocols used during an authentication process, such as OpenID Connect 1.0, OAuth 2.0, and SAML 2.0. Thus, the pattern or syntax can be added into the same request the service provider 110 typically uses to request access to user data according to these federation protocols.

After receiving the purpose from the service provider 110, the identity provider 105 can forward this purpose (along with the attribute and the access level) to the consent sub-system 120. The consent sub-system 120 is tasked with determining whether the user has provided consent for a service provider to use her data according to the stated purpose. That is, the consent sub-system 120 can provide user consent for the service provider 110 to use the user data according to its stated purpose. For example, the consent sub-system 120 can store user preferences which indicate for what purposes the user has already approved using her data. For instance, the user may have already given consent for her email address to be used for billing purposes, or that her telephone can be used to improve security. In that case, the consent sub-system 120 can evaluate the purpose, determine whether there is user consent, and then inform the identity provider 105 which can in turn provide the authorization token to the service provider 110.

Additionally, the consent sub-system 120 can check whether the stated purpose violates a legal or regulatory restriction. For example, some jurisdictions may have privacy laws and regulations governing when user data can be shared with other jurisdictions (i.e., geolocation restrictions). Further, privacy laws may restrict sharing user data for only certain types of purposes (e.g., to provide additional security or billing, but not for marketing). If providing the service provider 110 with consent to access the user data would violate a law or regulation, the consent sub-system 120 can instruct the identity provider 105 to deny the request—i.e., not provide the authorization token to the service provider 110.

If the consent sub-system 120 cannot provide consent, then the identity provider 105 can request consent from the user directly. For example, if the user has not previously given consent to share her data with a service provider 110 for the stated purpose, or doing so would violate a law or regulation, the identity provider 105 can send a request to the user for consent. As shown, the identity federation 100 is coupled to a network 125 which permits the identity provider 105, service provider 110, and consent sub-system 120 to communicate with each other, as well as communicate with user devices 130. The network 125 can be a local or wide access network. If the consent sub-system 120 was unable to provide user consent for a request received from the service provider 110, the identity provider 105 can use the network 125 to transmit a consent request to the user device 130 corresponding to the user. The consent request can indicate the same information that the identity provider 105 received from the service provider 110, such as the purpose-of-use, the attribute, and the requested access level. If this user consents, then the identity provider 105 transmits the authorization token to the service provider 110 which permits the service provider 110 to access the user data (i.e., the attribute) and to use the user data according to its stated purpose. Further, the identity provider 105 can update the consent sub-system 120 so that future requests to use the user data for the same (or similar) purpose are approved without again asking the user. In this manner, obtaining user consent can occur in the same authentication process used to obtain the token for accessing the user data.

Although not shown, the identity provider 105, the service provider 110, and the consent sub-system 120 can be implemented in software or can include computing systems that have one or more processors and memory.

Figure 2:
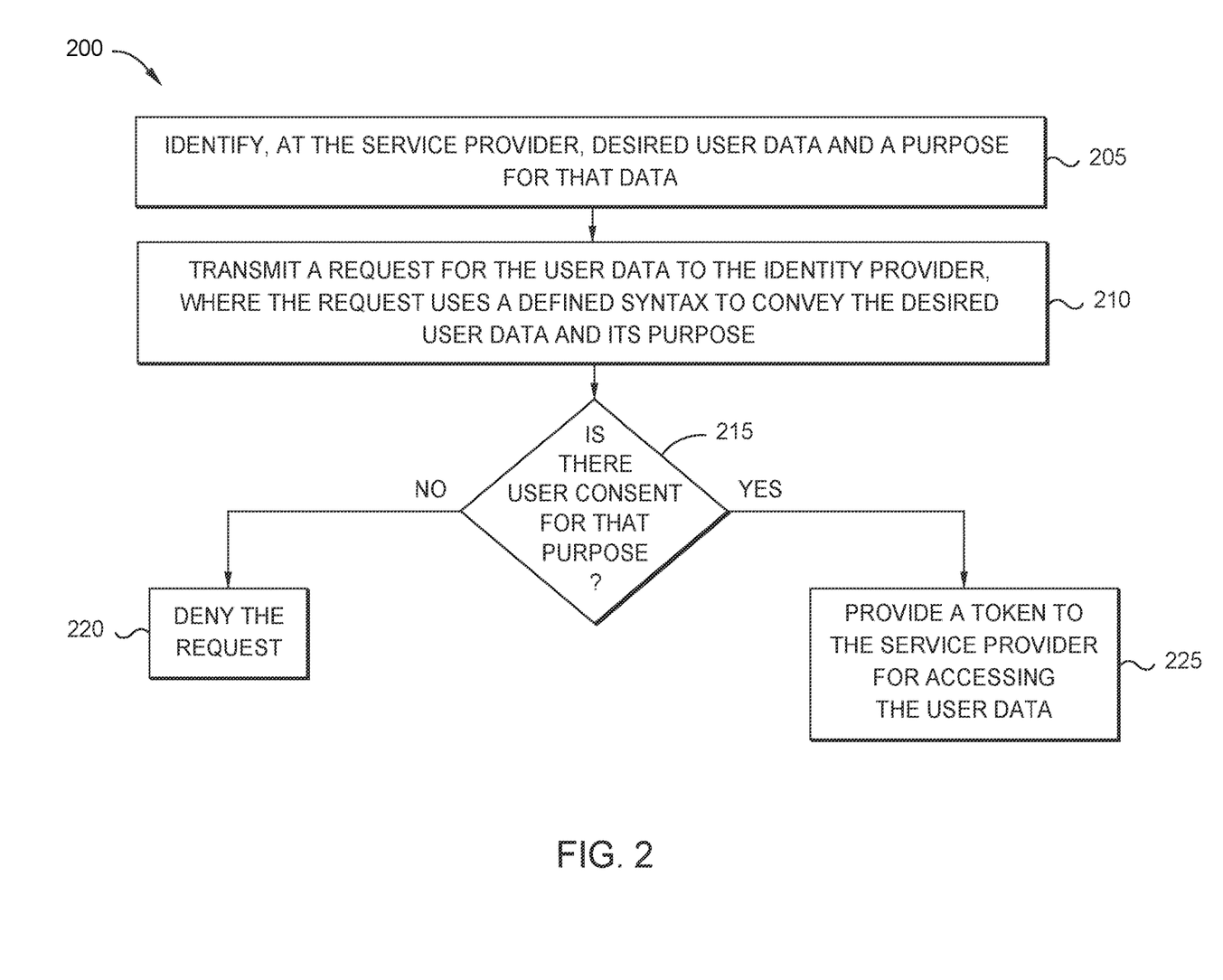
FIG. 2 is a flowchart for conveying a purpose for accessing PII during an authentication process, according to one example.

FIG. 2 is a flowchart of a method 200 for conveying a purpose for accessing user data during an authentication process, according to one example. At block 205, the service provider identifies desired user data (e.g., an attribute) and a purpose for that data (e.g., marketing, billing, security, etc.). In one embodiment, this user data may be separate from an authentication process used by the service and identity providers to authenticate a user attempting to use a service provided by the service provider. That is, the method 200 may occur after the identity provider has authenticated the user for the service provider. The service provider may then desire user data to use for a particular purpose as the user interacts with the service provider.

At block 210, the service provider (or the relying party application hosted by the service provider) transmits a request for the user data to the identity provider, where the request uses a defined syntax (or pattern) to indicate the desired user data and its purpose. One non-limiting example of a suitable syntax or pattern is {{purpose} }/{{attribute} }: {{access} }, where the "purpose" field conveys how the service provider will use the user data (e.g., PII), the "attribute" field indicates the specific type of user data being requested (e.g., email address, telephone number, government ID number, etc.), and the "access" field indicates the desired access level to the attribute—e.g., read-only, or read-and-write.

At block 215, the identity federation determines whether there is user consent for the service provider to use the identified attribute (at the expressed access level) for the stated purpose. In one embodiment, the identity provider forwards the request to the consent sub-system which determines whether the user has already preauthorized the user data to be used according to the stated purpose. For example, the user may have already given consent to use her email or telephone number for marketing or billing purposes. Or the user may have given permission for a different service provider to use her data for the same purpose being requested by the current service provider. Further, the consent sub-system can ensure that providing the user data with the service provider does not violate any laws or regulations.

If the consent sub-system is unable to provide consent, the identity provider may forward the request directly to the user—i.e., to a user device. The user can then give explicit consent for the service provider to use her data according to the stated purpose.

If the consent sub-system or the user does not provide consent, the method proceeds to block 220 where the identity provider denies the service provider's request. That is, the identity provider does not provide an authorization token to the service provider. Alternatively, if consent is given by the consent sub-system or directly by the user, the method 200 proceeds to block 225 where the identity provider provides the authorization token to the service provider for accessing the user data. Because consent was obtained during the authentication process described in method 200, by receiving the token, the service provider implicitly knows it has user consent to use the requested user data according to the purpose provided in the request described at block 210. The service provider can then use the token to retrieve the attribute (e.g., user data) recited in the request.

Figure 3:
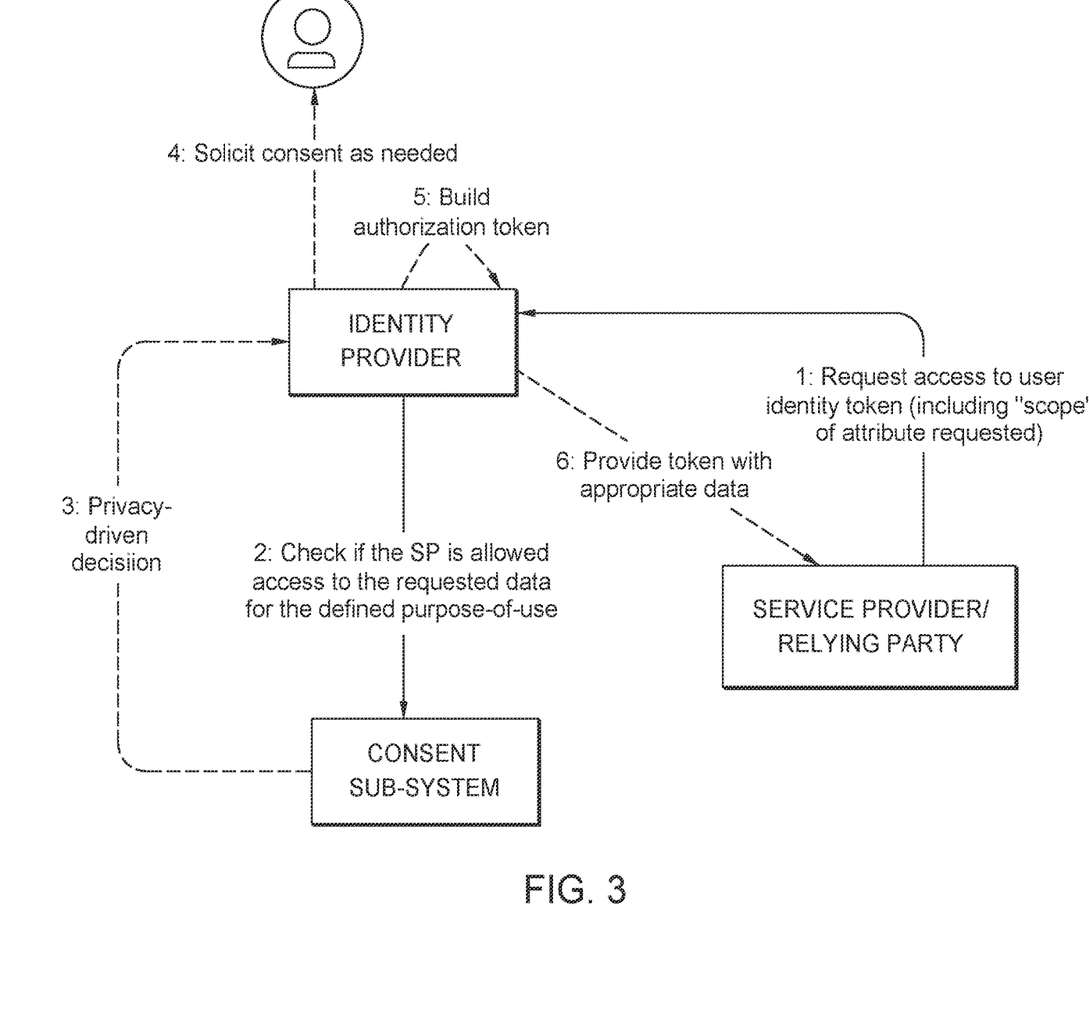
FIG. 3 is a workflow for obtaining consent during a web authentication process, according to one example.

FIG. 3 is a workflow for obtaining consent during a web authentication process, according to one example. In this example, the user communicates with the service provider (or the relying party application) and the identity provider using a web browser. That is, the user can use a web browser to access the service hosted by the service provider. Further, the user can use the web browser to provide her login credentials so the identity provider can authenticate the user for the service provider.

The workflow in FIG. 3 starts at Step 1 where the service provider determines that it wants access to user data for a specific purpose. In one embodiment, Step 1 is similar or the same as block 205 of FIG. 2 where the service provider identifies desired user data (e.g., an attribute) and a purpose for that data (e.g., marketing, billing, security, etc.). The service provider transmits a request to the identity provider that asks permission to access the desired user data or attribute. For example, Open ID Connect defines scopes that are used by the service provider to request user data from the identity provider. The service provider can add the purpose, attribute, and access level to the scope. In this manner, current federation protocols can be enriched by including this information in the requests for user data.

At Step 2, the identity provider sends a request to the consent sub-system to check whether the service provider is allowed access to the requested data for the defined purpose-of-use indicated in the request—e.g., the scope. The consent sub-system can determine whether the user has already preauthorized her data to be used according to the stated purpose. Further, the consent sub-system can ensure that providing the user data with the service provider does not violate any laws or regulations.

At Step 3, the consent sub-system transmits a privacy-driven decision to the identity provider. If the consent sub-system has determined the user has already provided consent to use the user data according to the purpose stated by the service provider, the consent sub-system can inform the identity provider that there is user consent. However, if the consent sub-system was unable to determine consent, or if granting access to the user data would violate a privacy law or regulation, at Step 4 the identity provider solicits consent from the user directly.

Assuming that the user gives explicit consent, or the consent sub-system provided consent, at Step 5 the identity provider builds an authorization token for the service provider. At Step 6 the identity provider transmits the authorization token to the service provider, along with any other information needed to access the user data. Thus, the workflow enables the identity federation to obtain user consent for the service provider to access the user data in the same process used to obtain the authorization token.

Figure 4:
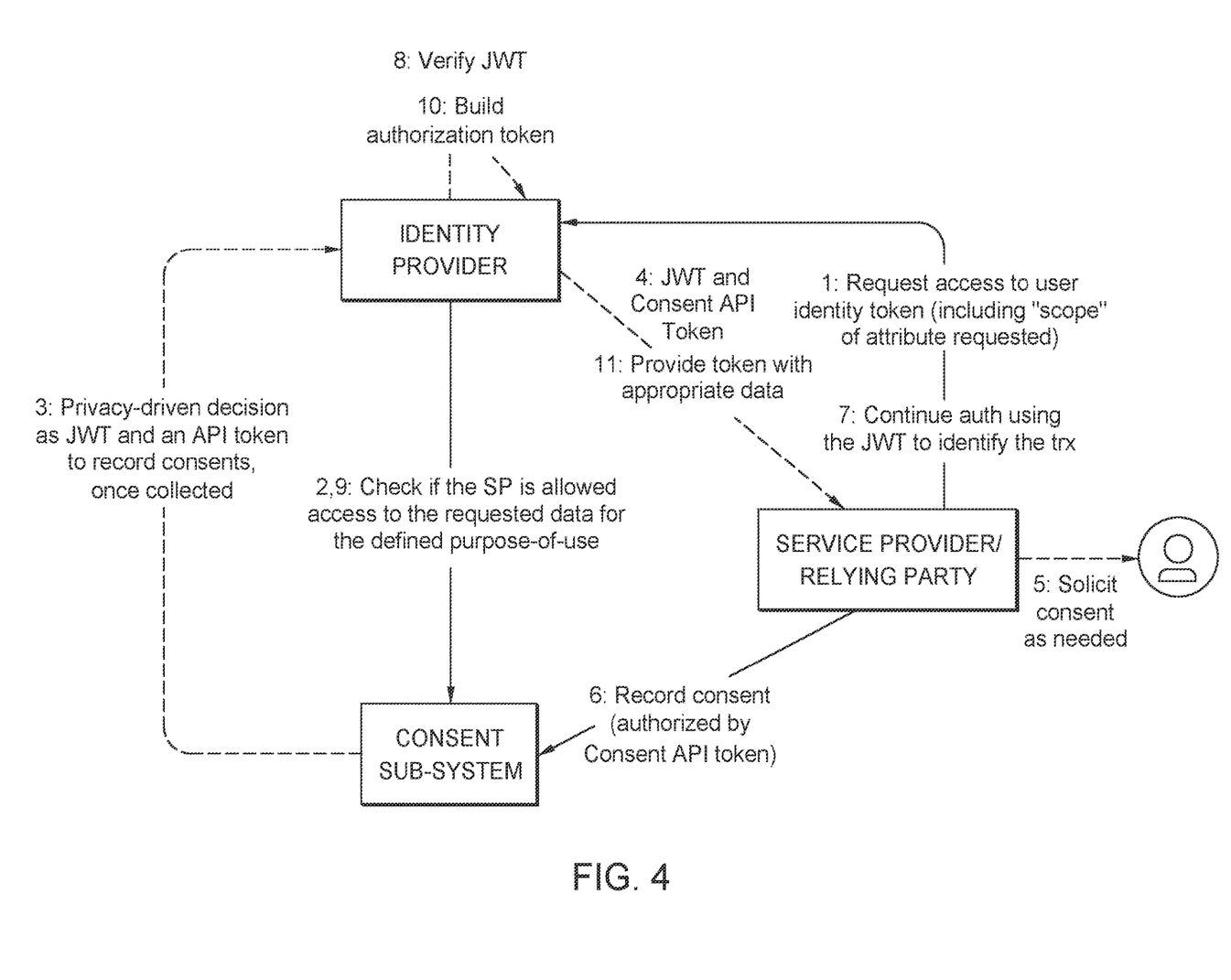
FIG. 4 is a workflow for obtaining consent during an application programmable interface (API) authentication process, according to one example.

FIG. 4 is a workflow for obtaining consent during an API authentication process, according to one example. Rather than providing the authorization tokens using a web browser like in FIG. 3, FIG. 4 uses APIs to retrieve the authorization token and obtain user consent. Unlike previous APIs authentication processes which do not permit interruptions for user consent, in FIG. 4, the consent can be integrated into the workflow. The API workflow in FIG. 4 may be used when the relying party application is an application (app) executing on the user's device (e.g., a mobile phone or tablet). In that case, there may not be an open web browser session that the identity provider can use to communicate with the user.

Instead, the workflow may use a user interface (UI) executed by the relying party application (i.e., the service provider) to obtain user consent. Moreover, the service provider can use an API to communicate with the identity provider.

The workflow in FIG. 4 starts at Step 1 where the service provider determines that it wants access to user data for a specific purpose. In one embodiment, Step 1 is similar or the same as block 205 of FIG. 2 where the service provider identifies desired user data (e.g., an attribute) and a purpose for that data (e.g., marketing, billing, security, etc.). The service provider transmits a request to the identity provider that asks permission to access the desired user data or attribute. For example, OpenID Connect defines scopes that are used by the service provider to request user data from the identity provider. The service provider can provide the purpose, attribute, and access level in the scope, thereby enriching the requests for user data.

At Step 2, the identity provider sends a request to the consent sub-system to check whether the service provider is allowed access to the requested data for the defined purpose-of-use indicated in the request—e.g., the scope. The consent sub-system can determine whether the user has already preauthorized her data to be used according to the stated purpose. Further, the consent sub-system can ensure that providing the user data with the service provider does not violate any laws or regulations.

At Step 3, the consent sub-system issues two token: a consent security token and a consent decision token (e.g., JavaScript Object Notation (JSON) web token (JWT)). The consent security token permits the service provider to store user consent in the consent sub-system. That is, the consent security token authorizes the service provider to obtain, and then store, user consent for the request in the consent sub-system. However, if the consent sub-system determines the user has preauthorized the service provider to use her data according to the stated purpose, then the consent sub-system would not need to provide the consent security token and the consent security token to the service provider. In other words, the consent sub-system can reach one of three decisions: allow (user already explicitly consented, or consent sub-system determined by itself that this should be allowed regardless of the user's consent), deny (user explicitly denied when asked for consent, or consent sub-system determined by itself that this should be denied regardless of the user's consent), or require consent. If the consent sub-system reaches the third decision, (require consent) then it generates the consent decision token and consent security token to be returned to the service provider. In the embodiments below, it is assumed that the content sub-system has reached the decision that consent is required, and thus, the consent sub-system provides the two tokens to the identity provider.

In one embodiment, the consent decision token (e.g., a JWT) is a signed token (which contains transactional information that cannot be tampered with) which permits the process to continue cryptographically (i.e., securely) the authentication process after it has been paused to obtain user consent.

At Step 4, the identity provider forwards the two tokens (i.e., the consent security token and the consent decision) to the service provider.

At Step 5, the service provider solicits consent from the user. That is, the service provider asks the user for consent to use the user attribute for the purposed identified at Step 1. If the relying party application is an app on the user's mobile phone or tablet, the app can use a UI to query the user for her consent. At this point, the authentication process is paused while waiting for the service provider to obtain user consent.

Assuming the user provides her consent, at Step 6 the service provider uses the consent security token to store the user consent in the consent sub-system. Put differently, the consent security token authorizes the service provider to store the consent in the consent sub-system.

At Step 7, the service provider continues the authentication process by using the consent decision token to inform (or remind) the identity provider of the transaction. That is, the authentication process was paused while the service provider obtained consent from the user and then stored that consent in the consent sub-system. The authentication process is then resumed by providing the consent decision token to the identity provider.

At Step 8, the identity provider verifies the received consent decision token, and if valid, at Step 9 the identity provider checks with the consent sub-system to determine whether the service provider is allowed to access the requested data for the defined purpose. This request may be the same request as transmitted at Step 2, but in the meantime, the service provider was able to obtain and store the user consent in the consent sub-system during Steps 5 and 6.

Because the service provider now has user consent, at Step 10 the consent sub-system informs the identity provider that user consent was obtained, and in response, the identity provider builds the authorization token.

At Step 11, the identity provider transmits the authorization token to the service provider, along with any other information needed to access the user data. In this manner, the workflow enables the identity federation to obtain user consent for the service provider to access the user data in the same process used to obtain the authorization token. In FIG. 4, the authentication process is paused to permit the service provider to obtain user consent, but then resumed using the consent decision token after consent is obtained.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the identity provider or the consent sub-system) or related data available in the cloud. For example, the consent sub-system could execute on a computing system in the cloud and store/manage user consent. Doing so allows the identity provider and the service provider to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
    identifying, at a service provider, user data requested by a first user and a purpose for the user data;
    transmitting, using a federation protocol, a request for the user data from the service provider to an identity provider, wherein the service provider and the identity provider are in an identity federation, wherein the request includes a defined syntax for conveying the purpose for the user data to the identity federation; and
    after obtaining user consent from a second user different from the first user for the user data to be used for the purpose identified by the service provider, receiving an authorization token from the identity provider to access the user data.

2. The method of claim 1, wherein the defined syntax used in the request comprises (i) a purpose field identifying the purpose for the user data, (ii) an attribute field identifying a type of the user data, and (iii) an access field indicating an access level corresponding to the user data.

3. The method of claim 1, wherein the service provider is controlled by a different entity than the identity provider, wherein the service provider and the identity provider have a relationship of trust in the identity federation where the service provider relies on the identity provider to authenticate users attempting to access a service provided by the service provider.

4. The method of claim 1, wherein the federation protocol comprises one of OpenID Connect, OAuth, or Security Assertion Markup Language (SAML).

5. The method of claim 1, wherein the identity federation comprises a consent sub-system tasked with determining whether a user has provided consent for the service provider to use the user data according to the purpose.

6. The method of claim 5, wherein, when the consent sub-system determines the user has not yet given consent, the identity provider is tasked with querying the user to obtain consent for the service provider to use the user data according to the purpose.

7. The method of claim 5, wherein, when the consent sub-system determines the user has not yet given consent, the method further comprises:
    receiving a consent security token and a consent decision token provided by the consent sub-system at the service provider, wherein an authentication process is paused while obtaining user consent;
    obtaining consent from the user using the service provider;
    updating, using the consent security token, the consent sub-system to indicate the user has now provided consent; and
    resuming the authentication process by transmitting the consent decision token from the service provider to the identity provider after obtaining consent from the user.

8. The method of claim 7, wherein the consent decision token is a JavaScript Object Notation (JSON) web token (JWT).

9. A service provider, comprising:
    a processor; and
    memory storing an application, which when executed by the processor performs an operation, the operation comprising:
        identifying, at a service provider, user data requested by a first user and a purpose for the user data;
        transmitting, using a federation protocol, a request for the user data to an identity provider, wherein the service provider and the identity provider are in an identity federation, wherein the request includes a defined syntax for conveying the purpose for the user data to the identity federation; and
        after obtaining user consent from a second user different from the first user for the user data to be used for the purpose identified by the service provider, receiving an authorization token from the identity provider to access the user data.

10. The service provider of claim 9, wherein the defined syntax used in the request comprises (i) a purpose field identifying the purpose for the user data, (ii) an attribute field identifying a type of the user data, and (iii) an access field indicating an access level corresponding to the user data.

11. The service provider of claim 9, wherein the service provider is controlled by a different entity than the identity provider, wherein the service provider and the identity provider have a relationship of trust in the identity federation where the service provider relies on the identity provider to authenticate users attempting to access a service provided by the service provider.

12. The service provider of claim 9, wherein the federation protocol comprises one of OpenID Connect, OAuth, or Security Assertion Markup Language (SAML).

13. The service provider of claim 9, wherein the identity federation comprises a consent sub-system tasked with determining whether a user has provided consent for the service provider to use the user data according to the purpose,
    wherein, when the consent sub-system determines the user has not yet given consent, the identity provider is tasked with querying the user to obtain consent for the service provider to use the user data according to the purpose.

14. The service provider of claim 9, wherein the identity federation comprises a consent sub-system tasked with determining whether a user has provided consent for the service provider to use the user data according to the purpose, wherein, when the consent sub-system determines the user has not yet given consent, the operation further comprises:
    receiving a consent security token and a consent decision token provided by the consent sub-system, wherein an authentication process is paused while obtaining user consent;
    obtaining consent from the user;
    updating, using the consent security token, the consent sub-system to indicate the user has now provided consent; and
    resuming the authentication process by transmitting the consent decision token to the identity provider after obtaining consent from the user.

15. A computer program product comprising:
a computer-readable storage medium having computer-readable program code embodied therewith, the computer-readable program code executable by one or more computer processors to perform an operation, the operation comprising:
    identifying, at a service provider, user data requested by a first user and a purpose for the user data;
    transmitting, using a federation protocol, a request for the user data from the service provider to an identity provider, wherein the service provider and the identity provider are in an identity federation, wherein the request includes a defined syntax for conveying the purpose for the user data to the identity federation; and
    after obtaining user consent from a second user different from the first user for the user data to be used for the purpose identified by the service provider, receiving an authorization token from the identity provider to access the user data.

16. The computer program product of claim 15, wherein the defined syntax used in the request comprises (i) a purpose field identifying the purpose for the user data, (ii) an attribute field identifying a type of the user data, and (iii) an access field indicating an access level corresponding to the user data.

17. The computer program product of claim 16, wherein the identity federation comprises a consent sub-system tasked with determining whether a user has provided consent for the service provider to use the user data according to the purpose,
    wherein, when the consent sub-system determines the user has not yet given consent, the identity provider is tasked with querying the user to obtain consent for the service provider to use the user data according to the purpose.

18. The computer program product of claim 16, wherein the identity federation comprises a consent sub-system tasked with determining whether a user has provided consent for the service provider to use the user data according to the purpose,
    wherein, when the consent sub-system determines the user has not yet given consent, the operation further comprises:
    receiving a consent security token and a consent decision token provided by the consent sub-system at the service provider, wherein an authentication process is paused while obtaining user consent;
    obtaining consent from the user using the service provider;
    updating, using the consent security token, the consent sub-system to indicate the user has now provided consent; and
    resuming the authentication process by transmitting the consent decision token from the service provider to the identity provider after obtaining consent from the user.

19. The computer program product of claim 15, wherein the service provider is controlled by a different entity than the identity provider, wherein the service provider and the identity provider have a relationship of trust in the identity federation where the service provider relies on the identity provider to authenticate users attempting to access a service provided by the service provider.

20. The computer program product of claim 15, wherein the federation protocol comprises one of OpenID Connect, OAuth, or Security Assertion Markup Language (SAML).

* * * * *